(12) United States Patent
Hirano et al.

(10) Patent No.: US 6,608,830 B1
(45) Date of Patent: Aug. 19, 2003

(54) ROUTER

(75) Inventors: Hisashi Hirano, Hamamatsu (JP); Ryota Hirose, Hamamatsu (JP); Tsuneyuki Koikeda, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 09/480,167

(22) Filed: Jan. 10, 2000

(30) Foreign Application Priority Data

Jan. 12, 1999 (JP) .......................................... 11-005827

(51) Int. Cl.⁷ .............................................. H04L 12/28
(52) U.S. Cl. ....................................... 370/351; 370/463
(58) Field of Search ............................ 370/351, 352–3, 370/354–7, 359, 389, 395.31, 400, 431, 463, 475, 474

(56) References Cited

U.S. PATENT DOCUMENTS

| | | | | |
|---|---|---|---|---|
| 6,108,330 A | * | 8/2000 | Bhatia et al. ............... | 370/352 |
| 6,456,625 B1 | * | 9/2002 | Itoi ............................. | 370/401 |
| 6,507,585 B1 | * | 1/2003 | Dobson ...................... | 370/420 |
| 6,515,974 B1 | * | 2/2003 | Inoue et al. ................ | 370/331 |

* cited by examiner

Primary Examiner—David Vincent

(57) ABSTRACT

A router controls transmission of packets over a plurality of networks. The router has a function of carrying out address translation of addresses added to the packets between private addresses and global addresses. A plurality of interfaces are each connected to a corresponding one of the plurality of networks. A first storage device stores data for the address translation, the data being set by a user. A second storage device stores information for applying the data stored in the first storage device to each of the plurality of interfaces, the information being set by the user. A control device prepares translation management information for each of the plurality of interfaces, based on the data stored in the first storage device and the information stored in the second storage device. A translation device is arranged in each of the plurality of interfaces, for carrying out the address translation of one of the addresses added to each packet of the packets, based on the translation management information.

10 Claims, 13 Drawing Sheets

|      | 1  | 2 | 3 | 4 |
|------|----|---|---|---|
| PP1  | K1 |   |   |   |
| PP2  |    |   |   |   |
| ⋮    | ⋮  | ⋮ |   |   |
| LAN1 |    |   |   |   |
| LAN2 |    |   |   |   |

FIG.8

| GLOBAL ADDRESS | PRIVATE ADDRESS | LIFE |
|---|---|---|
| 133. 176. 200. 10 | 192. 168. 0. 2 | — |
| 133. 176. 200. 11 | 192. 168. 0. 3 | — |
| 133. 176. 200. 12 | AUTO | |
| 133. 176. 200. 13 | AUTO | |
| 133. 176. 200. 14 | AUTO | |

| PROTOCOL | PRIVATE ADDRESS | PRIVATE PORT NUMBER | DESTINATION ADDRESS | DESTINATION PORT NUMBER | GLOBAL ADDRESS | GLOBAL PORT NUMBER | LIFE |
|---|---|---|---|---|---|---|---|
| TCP | 192.168.10.2 | 80 | * | * | * | * | |
| UDP | 192.168.10.3 | 6112 | * | * | * | * | |
| | | | | | | | |
| | | | | | | | |
| | | | | | | | |
| | | | | | | | |
| | | | | | | | |
| | | | | | | | |

ND4

NAT DESCRIPTOR DEFINITION INFORMATION

| NAT DESCRIPTOR NUMBER | TG1 |
| TYPE OF PROCESSING | TG2 |
| GLOBAL ADDRESS LIST | TG3 |
| PRIVATE ADDRESS LIST | TG4 |
| STATIC NAT LIST | TG5 |
| STATIC MASQUERADE LIST | TG6 |

| STARTING ADDRESS | ENDING ADDRESS |
| --- | --- |
| GLOBAL ADDRESS | GLOBAL ADDRESS |
| | |
| ⋮ | ⋮ |

| STARTING ADDRESS | ENDING ADDRESS |
| --- | --- |
| PRIVATE ADDRESS | PRIVATE ADDRESS |
| | |
| ⋮ | ⋮ |

FIG.13

| GLOBAL ADDRESS | PRIVATE ADDRESS |
|---|---|
|  |  |
|  |  |
| ⋮ | ⋮ |

FIG.14

| PRIVATE ADDRESS | PROTOCOL | PORT NUMBER |
|---|---|---|
|  |  |  |
| ⋮ | ⋮ | ⋮ |

FIG.15

NAT DESCRIPTOR APPLICATION SETTING INFORMATION

|  | NAT DESCRIPTOR NUMBER | NAT DESCRIPTOR NUMBER | NAT DESCRIPTOR NUMBER | NAT DESCRIPTOR NUMBER |
|---|---|---|---|---|
| PP1 |  |  |  |  |
| PP2 |  |  |  |  |
| ⋮ | ⋮ | ⋮ | ⋮ | ⋮ |
| LAN1 |  |  |  |  |
| LAN2 |  |  |  |  |

| | STATE OF LINE CONNECTION | IPCP ADDRESS |
|---|---|---|
| PP1 | | |
| PP2 | | |
| ⋮ | ⋮ | ⋮ |

ROUTER

BACKGROUND OF THE INVENTION

1. Field of the Invention

This invention relates to a router for use in various kinds of networks, such as the Internet.

2. Prior Art

As is well known in the art, communication over the Internet is controlled according to a suite of protocols referred to as Transmission Control Protocol/Internet Protocol (TCP/IP). When data (file) is sent over the Internet, the TCP at the sending end divides the data into packets and add, to each packet, information indicative of a type of application program to which the packets are to be passed at the receiving end, while at the receiving end, the TCP checks whether each packet has any error and reassembles the packets into the file. FIG. 2 shows a format of the TCP header. The IP at the sending end adds, to each packet, an IP address indicative of a destination of the data, while at the receiving end, the IP checks the IP address of the packet to determine whether the packet is addressed to the receiving end. FIG. 3 shows a format of the IP header. In the TCP/IP, the TCP and IP headers are added to each unit of data unit to be sent, to form each packet, and then the packet is transmitted over networks. User Datagram Protocol (UDP) is also utilized besides the TCP. FIG. 4 shows a format of the UDP header.

A router is used for controlling transmission of packets each having the headers added thereto over networks. The router stores a routing table therein, and checks the IP address of each packet transmitted from another node by referring to the routing table, to thereby determine the next destination or node of the packet and sends out the packet to the next destination.

In recent years, it is realized that resources of 32-bit IP addresses are becoming short, so that routers are often provided with a NAT (Network Address Translation) function, an IP masquerade function, and so forth, to compensate for the shortage of the IP addresses. The NAT function translates a private IP address used in a LAN (Local Area Network) into a global IP address, and then transmits each packet having the global address onto the Internet, or translates a global IP address of each packet received via the Internet into a private IP address, and then transmits the packet to a destination computer having the private IP address within the LAN. The NAT includes static NAT and dynamic NAT. According to the static NAT, a private IP address and a corresponding global IP address for translation therebetween are predetermined (preset), while according to the dynamic NAT, a private IP address of a node which starts communication is automatically set at the start of the communication as an address for translation into a global IP address.

The IP masquerade is used to perform not only translation of IP addresses but also translation of corresponding port numbers of the TCP/UDP protocols as upper-layer protocols functioning over the IP layer, thereby enabling a plurality of computers within the LAN to connect to a computer outside the network by using a single global IP address. The IP masquerade also includes static IP masquerade and dynamic IP masquerade (usually, the latter is simply referred to as "the IP masquerade"). According to the static IP masquerade, a private IP address and a global IP address for translation therebetween, and port numbers for the respective private and global IP addresses, are preset, whereas according to the dynamic IP masquerade, a private IP address for translation and its port number are set automatically at the start of communication.

FIG. 1 shows the arrangement of a conventional router 100 of this kind. The router 100 is comprised of a routing system 101, a BRI (integrated services digital network (ISDN) Basic Rate Interface) controller 102 for performing physical control of data transmission between the routing system 101 and an ISDN line, and an Ethernet controller 103 for performing physical control of data transmission between the routing system 101 and a LAN.

The routing system 101 includes a CPU (central processing unit), a ROM (read only memory) storing various programs which are executed by the CPU, and a RAM (random access memory) for use in temporary storage of data. In FIG. 1, each block shows a function implemented by a corresponding program module. Reference numeral 104 indicates the function of IP routing for routing each packet to be transmitted. Reference numerals 105 and 106 designate interfaces for performing address translation and line connection by NAT or IP masquerade.

However, the above conventional router suffers from the following problems:

(1) The router 100 is designed exclusively for connection with the Internet, and hence the interfaces 105 and 106 are provided only for connection with the ISDN line, which makes it impossible to use the router 100 e.g. for transmission of data between two LAN systems constructed within an office.

(2) It is impossible to assign more than one function to each interface, which leads to drawbacks of incapability of application of both dynamic NAT and dynamic IP masquerade, a limited possible combination of private IP addresses and global IP addresses by static NAT, and incapability of complex network address translation.

SUMMARY OF THE INVENTION

It is an object of the present invention to provide a router which is so flexible that it permits setting a plurality of functions to each interface and can be adapted to transmission of data between LAN systems.

To attain the above object, the present invention provides a router that has an address translation capability of performing address translation between private addresses and global addresses, the router comprising:

a first storage block that stores data for translation, the data being set by a user;

a second storage block that stores information for applying the data stored in the first storage block to each interface, the information being set by the user;

a control block that generates translation management information for the each interface, based on the data stored in the first storage block and the information stored in the second storage block; and a translation block that translates an address contained in each packet, based on the translation management information.

Preferably, the data stored in the first storage block comprises data of a first list that defines ranges of the global addresses, data of a second list that defines ranges of the private addresses, and data of a third list that defines correspondence between each of the global addresses and each of the private addresses.

Preferably, the second storage block stores a plurality of sets of the information each in association with the each interface.

More preferably the data stored in the first storage block further includes data of a fourth list defining corresponding between each of port numbers and each of the private addresses, and wherein the translation block carries out translation of a private address or a global address and a port number associated with the private address or the global address, the private address or the global address and the port number being contained in each packet.

Preferably, the translation management information generated by the control block includes a network address translation management table in which a plurality of global addresses and a plurality of private addresses correlated to part of the plurality of global addresses, respectively, are written in advance for use in static network address translation, and a private address is written in a manner correlated to one of the remainder of the plurality of global addresses at a start of communication via the router, for use in dynamic network address translation.

Preferably, the translation management information generated by the control block includes a masquerade management table in which a combination of a protocol, a private address, and a port number associated with the private address are written in advance, and a destination address, a destination port number, a global address, and a life are written in a manner correlated to the combination, at a start of communication via the router, for use in static IP masquerade. More preferably, a combination of a protocol, a private address, a port number associated with the private address, a destination address, a destination port number, a global address, and a life are written in the masquerade management table at a start of communication via the router, for use in dynamic IP masquerade.

The above and other objects, features, and advantages of the invention will become more apparent from the following detailed description taken in conjunction with the accompanying drawings.

BRIEF DESCRIPTION OF THE DRAWINGS

FIG. 8 shows an example of a NAT management table contained in the FIG. 7 NAT descriptor management information;

FIG. 9 shows an example of a masquerade management table contained in the FIG. 7 NAT descriptor management information;

FIG. 13 shows a format of a static NAT list contained in the FIG. 10 NAT descriptor definition information;

FIG. 14 shows a format of a static masquerade list contained in the FIG. 10 NAT descriptor definition information;

FIG. 15 shows a format of NAT descriptor application setting information;

DETAILED DESCRIPTION

The present invention will now be described in detail with reference to the drawings showing an embodiment thereof.

Figure 1:
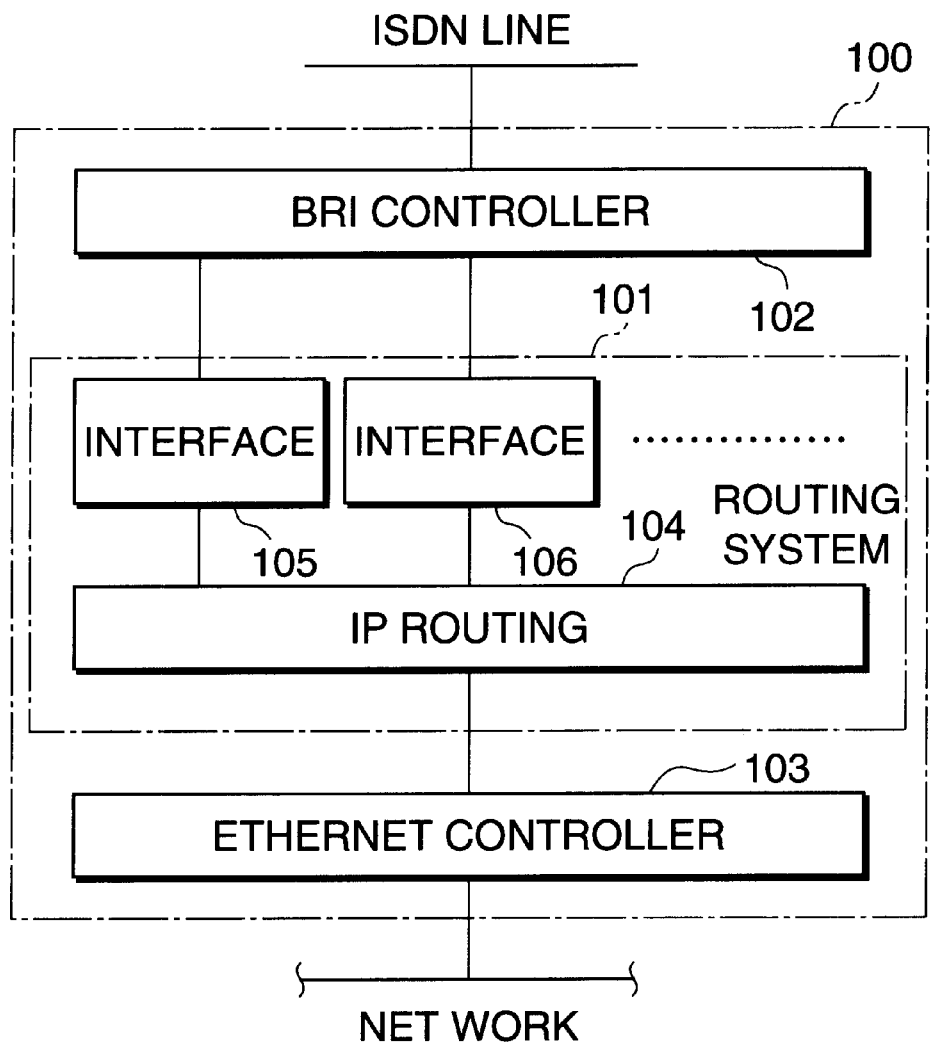
FIG. 1 is a block diagram showing the arrangement of a conventional router.
Figure 2:
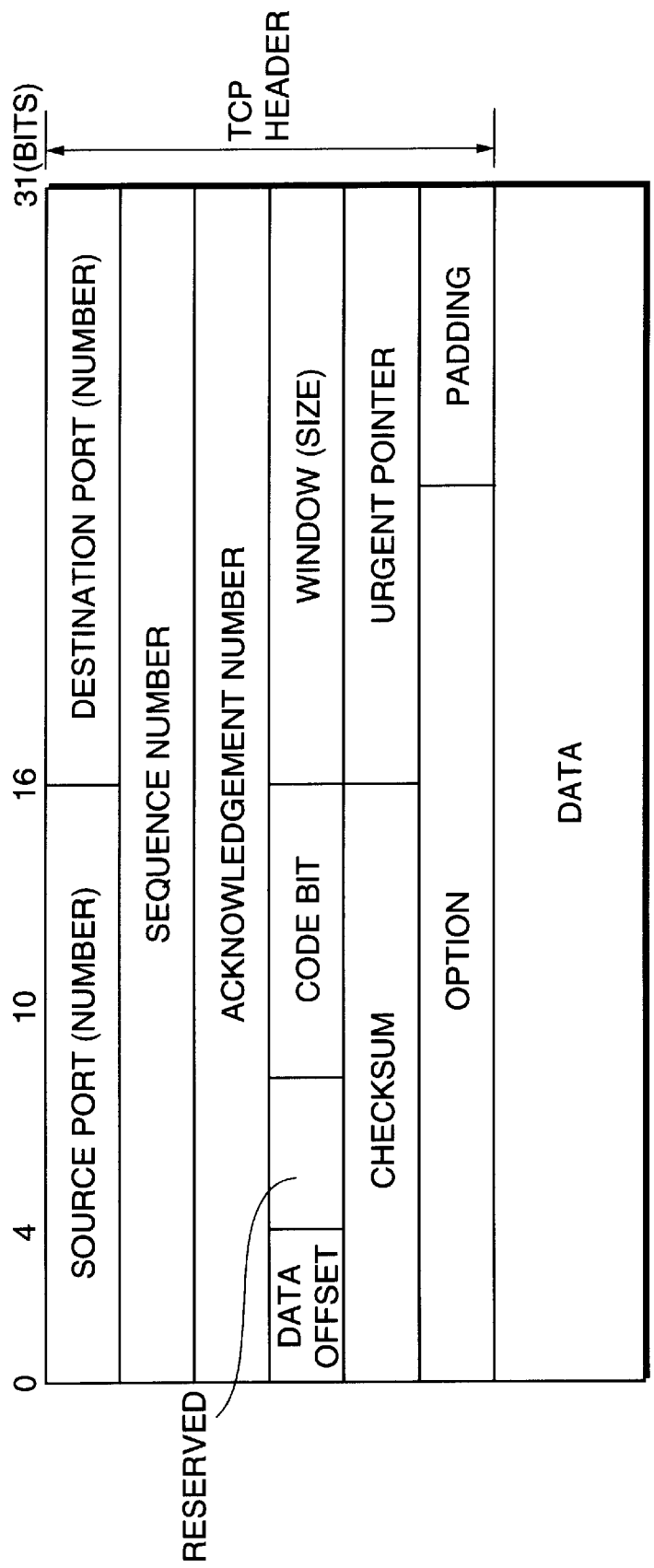
FIG. 2 shows a format of a TCP header.
Figure 3:
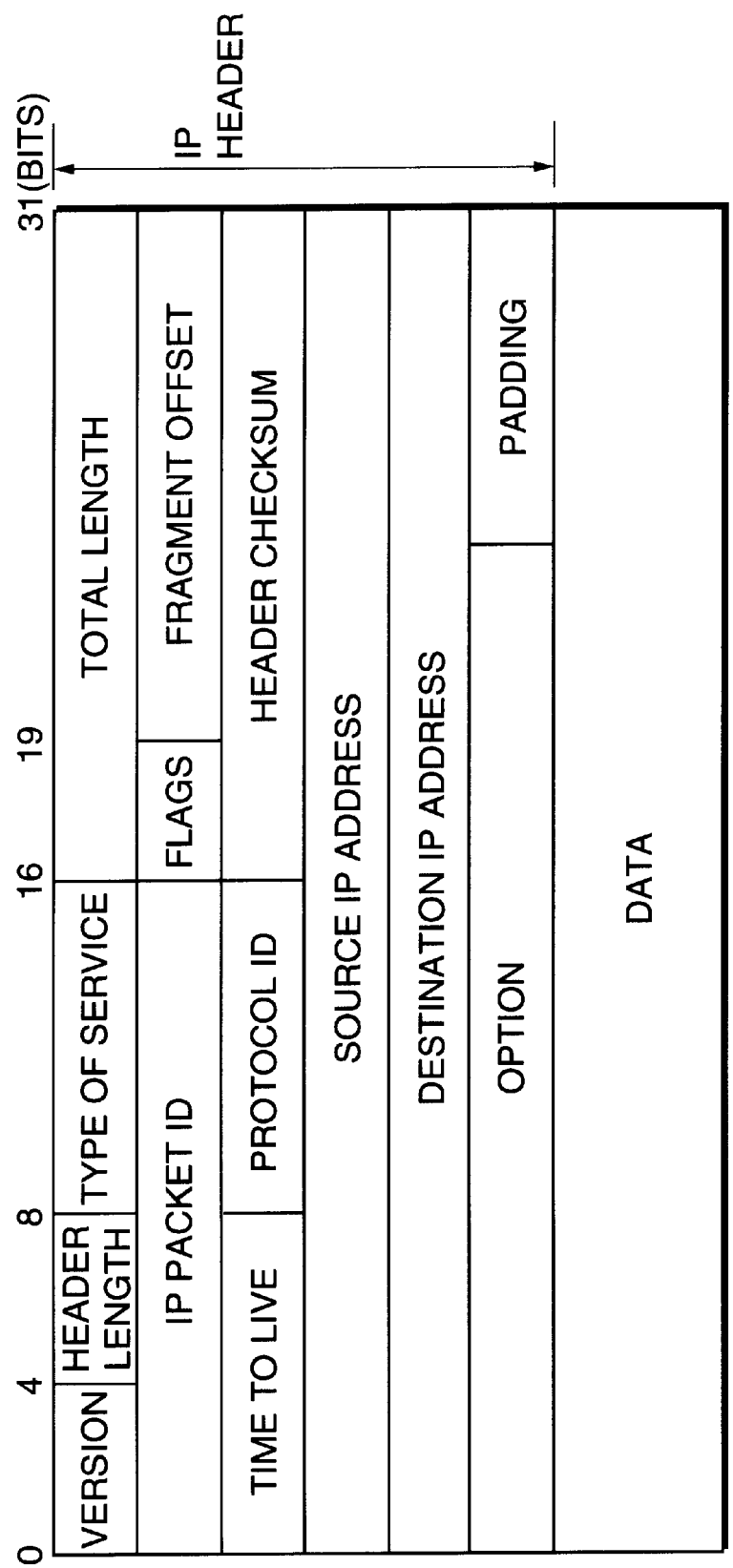
FIG. 3 shows a format of an IP header.
Figure 4:
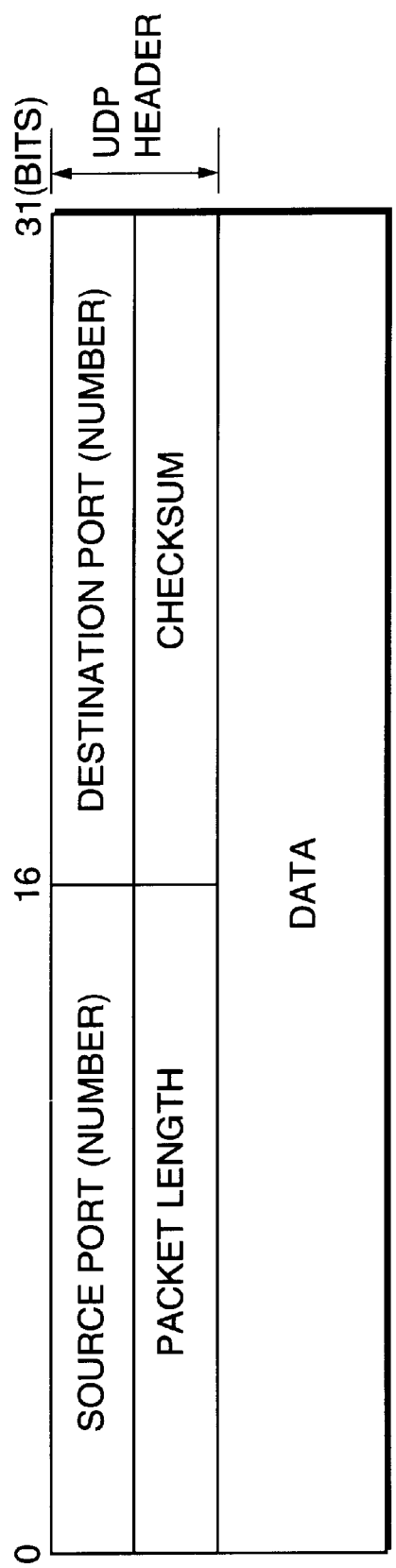
FIG. 4 shows a format of a UDP header.
Figure 5:
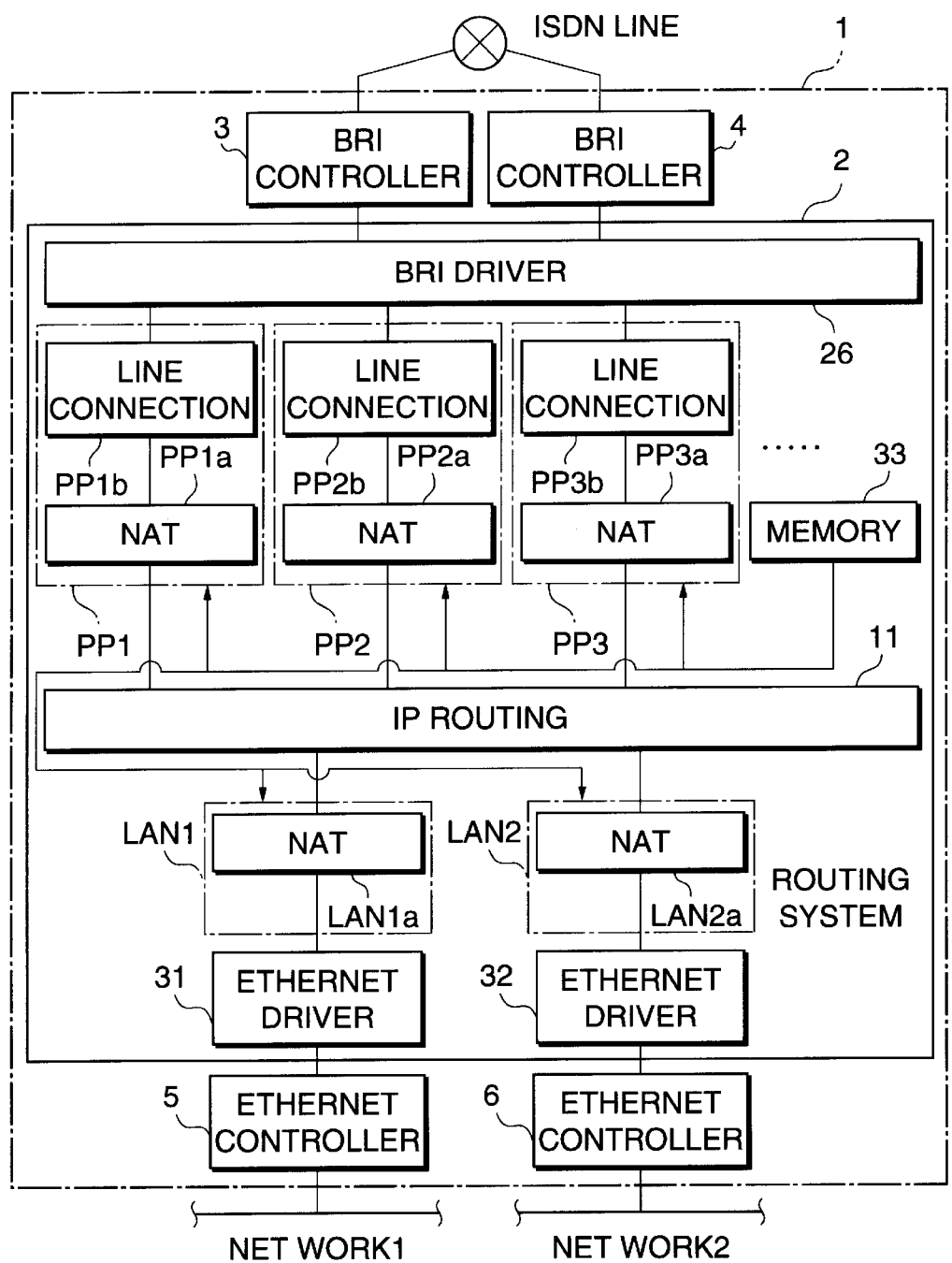
FIG. 5 is a block diagram showing the arrangement of a router according to an embodiment of the present invention.

Referring first to FIG. 5, there is shown the arrangement of a router 1 according to an embodiment of the invention. The router 1 is comprised of a routing system 2, BRI controllers 3 and 4 for performing physical control of data transmission between the routing system 2 and an ISDN line, and Ethernet controllers 5 and 6 for performing physical control of data transmission between the routing system 2 and LAN's.

The routing system 2 includes a CPU, a ROM storing various programs which are executed by the CPU, and a RAM for use in temporary storage of data. In FIG. 5, each block shows a function implemented by a corresponding program module. The functions represented by the respective blocks will be described hereinbelow.

First, reference numeral 11 designates a function of IP (Internet Protocol) routing for routing each packet to be transmitted. This process is well known in the art, and hence detailed description thereof is omitted. Symbols PP1 to PP3 as well as LAN1 and LAN2 designate respective interfaces, which will be described in detail hereinafter. Reference numeral 26 designates a BRI driver, while reference numerals 31 and 32 designate respective Ethernet drivers.

Next, the interfaces PP1 to PP3 as well as LAN1 and LAN2 will be described in detail.

Figures 6, 7:
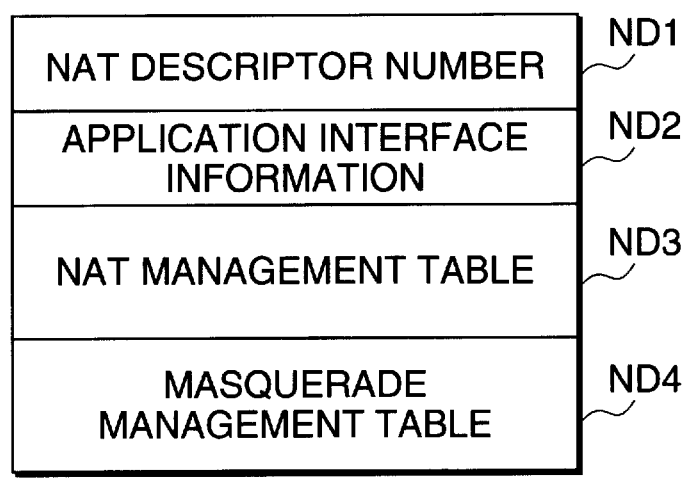
FIG. 6 shows a state of settings of NAT descriptor management information for use by interfaces PP1, PP2, . . . , LAN1, and LAN2 of the router according to the embodiment.
FIG. 7 shows a format of the NAT descriptor management information.

These interfaces perform address translation and line connection by NAT or IP masquerade. The routing system 2 has a memory 33, in areas of which are respectively stored NAT descriptior definition information and NAT descriptor application setting information, described hereinafter, as well as NAT descriptor management information preset in a manner correlated to each of the interfaces. The interfaces perform address translation based on the NAT descriptor management information. When IP masquerade is used, port number translation is also carried out based on the information. FIG. 6 shows how the management information is set in the memory. As shown in the figure, it is possible to set four sets of the management information in a manner correlated to each of the interfaces PP1 to PP3 as well as LAN1 and LAN2. FIG. 7 shows a format of each set of the management information. As shown in the figure, the management information is comprised of a NAT descriptor number ND1, application interface information ND2, a NAT management table ND3, and a masquerade management table ND4. It should be noted that the interfaces LAN 1 and LAN 2 have respective predetermined global addresses assigned thereto.

FIG. 8 shows an example of the NAT management table ND3. The NAT management table ND3 is comprised of three items, i.e. "global address", "private address", and "life". In the table ND3, first and second rows are provided for static NAT, in each of which a private address is preset. On the other hand, a third row and subsequent rows are provided for dynamic NAT, into each of which a private address is written at the start of communication. The "life" is a time period to be set to a timer for use when dynamic NAT is used. When a time period written in a cell of the "life" column has elapsed after a private address is written into a corresponding cell of the same row, the private address is erased automatically.

FIG. 9 shows an example of the masquerade management table ND4. The masquerade management table ND4 is comprised of eight items, i.e. "application protocol", "private address", "private port number", "destination address", "destination port number", "global address", "global port number", and "life". In the table ND4, first and second rows are provided for static IP masquerade, and each asterisk appearing in the table indicates that data of the cell is preset by the user. A third row and subsequent rows are provided for dynamic IP masquerade, into each of which data for the items is written at the start of communication. The "life" is a time period to be set to a timer for use when dynamic IP masquerade is used. When a time period written in a cell of the "life" column has elapsed after data is written into a corresponding cell of the same row, the data is erased automatically.

Figures 10, 11, 12:
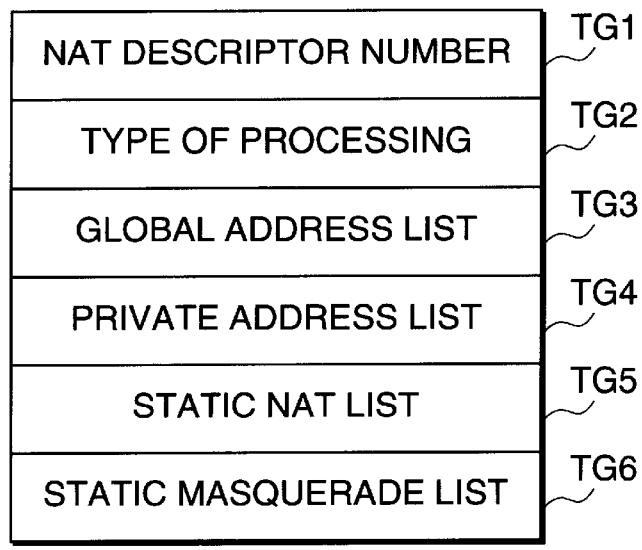
FIG. 10 shows a format of NAT descriptor definition information.
FIG. 11 shows a format of a global address list contained in the FIG. 10 NAT descriptor definition information.
FIG. 12 shows a format of a private address list contained in the FIG. 10 NAT descriptor definition information.

Next, a process of preparation of the NAT descriptor management information will be described. FIG. 10 shows a format of the NAT descriptor definition information. Each data item of the NAT descriptor definition information is set by the user. Symbol TG1 in the figure indicates a NAT descriptor number, while symbol TG2 indicates a type of processing, in which either "NAT" or "IP masquerade" is set as the type. Symbol TG3 indicates a global address list, which is formed as shown in FIG. 11. The global address list is set by specifying starting and ending addresses and can contain a plurality of pairs of starting and ending addresses. Symbol TG4 indicates a private address list, which is formed as shown in FIG. 12. The private address list is also set by specifying starting and ending addresses and can contain a plurality of pairs of starting and ending addresses.

Symbol TG5 indicates a static NAT list. As shown in FIG. 13, in the static NAT list, a plurality of pairs of global and private addresses are set. Symbol TG6 indicates a static masquerade list. As shown in FIG. 14, in the static masquerade list, a private address, a protocol, and a port number are set in a manner associated with each other.

It should be noted that the NAT descriptor definition information can be configured such that for dial-up connection to an internet access provider, an IPCP address, referred to hereinafter, is used for global addresses in the FIG. 11 global address list and the FIG. 13 static NAT list.

A plurality of sets of the NAT descriptor definition information described above are set by the user.

Referring next to FIG. 15, there is shown the NAT descriptor application setting information, in which each data item is entered by the user. The NAT descriptor application setting information is set in association with each of the interfaces PP1, PP2, . . . , LAN1, and LAN2, and it is possible to specify four NAT descriptor numbers for one interface. Each NAT descriptor number designates a set of NAT descriptor definition information whose format is shown in FIG. 10 and having a corresponding number.

When the NAT descriptor definition information and the NAT descriptor application setting information are set or modified, the data entered by the user are translated into formats which can be easily processed by the router. Then, when the router is turned on, or when definition information or other information is modified, the NAT descriptor management information shown in FIGS. 6 to 9 is prepared based on the NAT descriptor definition information and the NAT descriptor application setting information described above. More specifically, the NAT descriptor management information is prepared, set by set, from the sets of the definition information associated with the respective descriptor numbers specified in the NAT descriptor application setting information, in the order in which the descriptor numbers are listed in the NAT descriptor application setting information. However, the NAT descriptor management information is not prepared when there is no entry of corresponding application setting information, or when corresponding definition information or application setting information is not configured properly.

Figure 16:
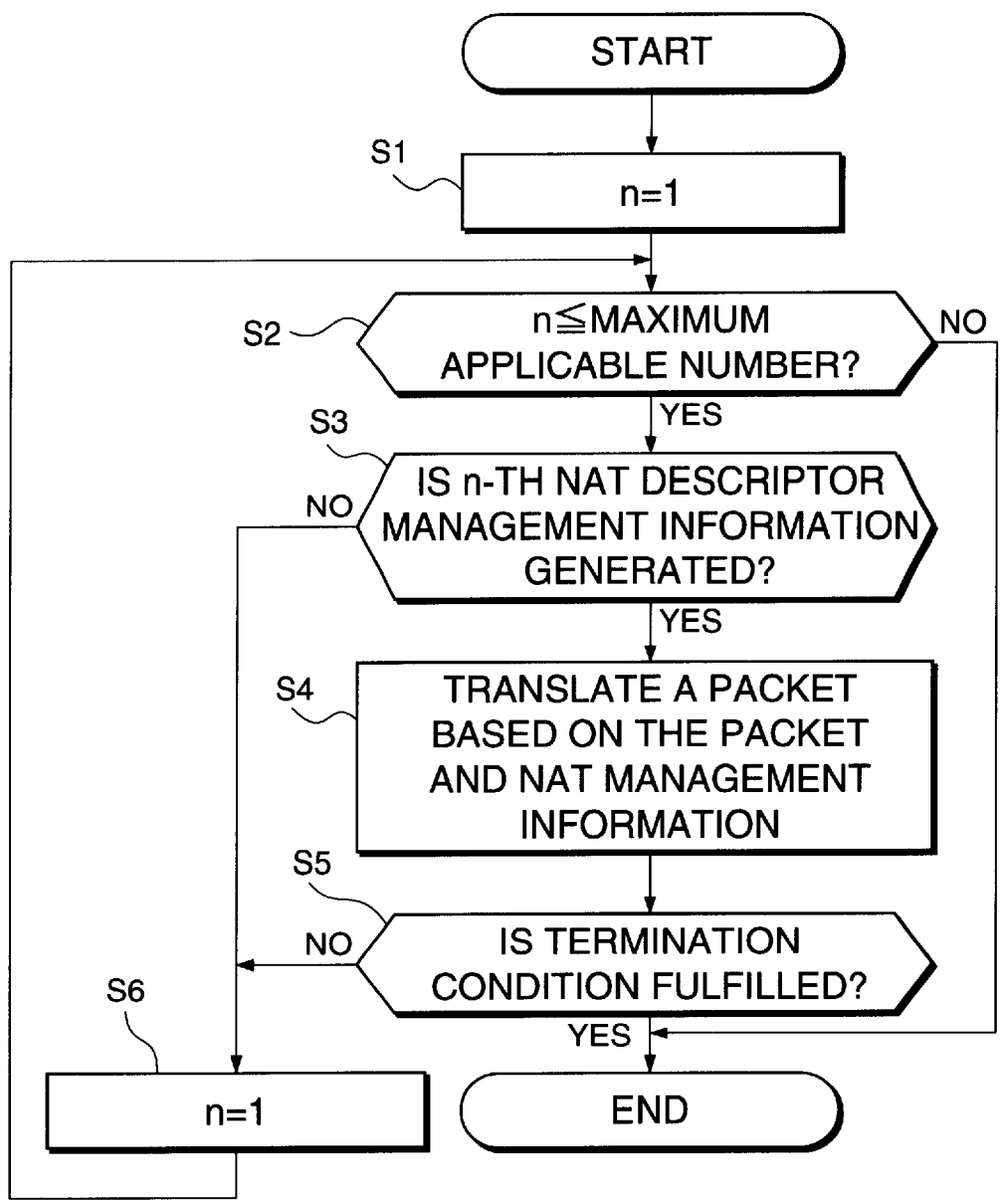
FIG. 16 is a flowchart showing a NAT process routine carried out by an interface PP1 appearing in FIG. 5.

Referring again to FIG. 5, symbol PP1a in the interface PP1 designates a block which carries out translation of an address of a passing packet based on the NAT descriptor management information (FIG. 6) described above. FIG. 16 shows a routine for carrying out this process, i.e. network address translation. At a step S1, a count n is set to "1". Then, the program proceeds to a step S2, wherein it is determined whether or not the count n is smaller than the maximum applicable number "4". If the answer to the question is affirmative (Yes), the program proceeds to a step S3, wherein it is determined whether or not an nth set of the NAT descriptor management information has been prepared. More specifically, in the present case, it is determined whether or not management information indicated by symbol K1 in FIG. 6 has been prepared. If the information has been prepared, i.e. if the answer to the question is affirmative (Yes), the program proceeds to a step S4, wherein translation of an address of a passing packet (and translation of a port number of the same in the case of IP masquerade being used) is carried out based on information available from the packet and the NAT descriptor management information. The method of the translation is the same as the conventional one. Then, the program proceeds to a step 5, wherein it is determined whether or not a termination condition is fulfilled. If the answer to the question of the step S5 is affirmative (Yes), the process is terminated.

On the other hand, if the answer to the question of the step S3 is negative (No), the program proceeds to a step S6, wherein the count n is incremented by "1", followed by repeated carrying out the determinations at the steps S2 and S3. When the count n becomes equal to "5", the answer to the question of the step S2 becomes negative (No), so that the present process is terminated. In the above described manner, the address translation is carried out by the block PP1a. Blocks PP2a and PP3a operate similarly. Further, a block LAN1a of the interface LAN1 and a block LAN2a of the interface LAN2 also operate similarly.

Symbol PP1b in the interface PP1 (FIG. 5) designates a block which carries out line connection processing including dialing of a preset telephone number. Symbols PP2b and PP3b also designate blocks which carry out line connection processing.

Next, the operation of the router configured as above will be described by referring to a case in which a computer (hereinafter referred to as "the computer A") on the network 1 appearing in FIG. 5 sends data to a computer in another office via the ISDN line. In this case, the block LAN1a of the interface LAN1 is set to an inoperative state. Each packet transmitted from the computer A carries a private address assigned to the computer A as a source address. The packet is passed via the Ethernet controller 5 and the Ethernet driver 31 to the IP routing block 11, which carries out routing of the packet. After completion of the routing, the packet is passed e.g. to the block PP1*a* for address translation, which translates the private address as the source address into a global address based on the NAT descriptor management information (FIG. 6).

Figures 17, 18:
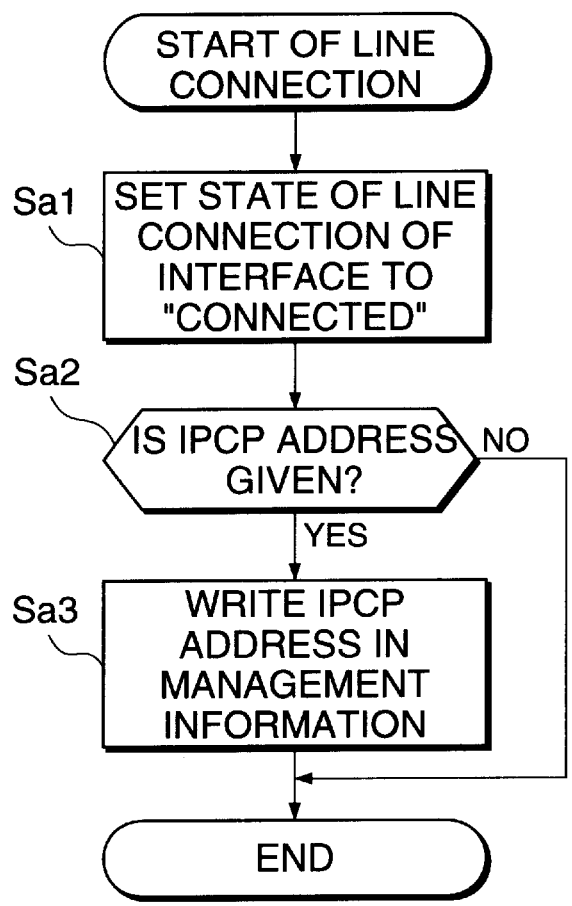
FIG. 17 is a flowchart showing a process routine carried out by the interface PP1 when line connection is started.
FIG. 18 shows a format of a table in which states of line connection are written.
Figure 19:
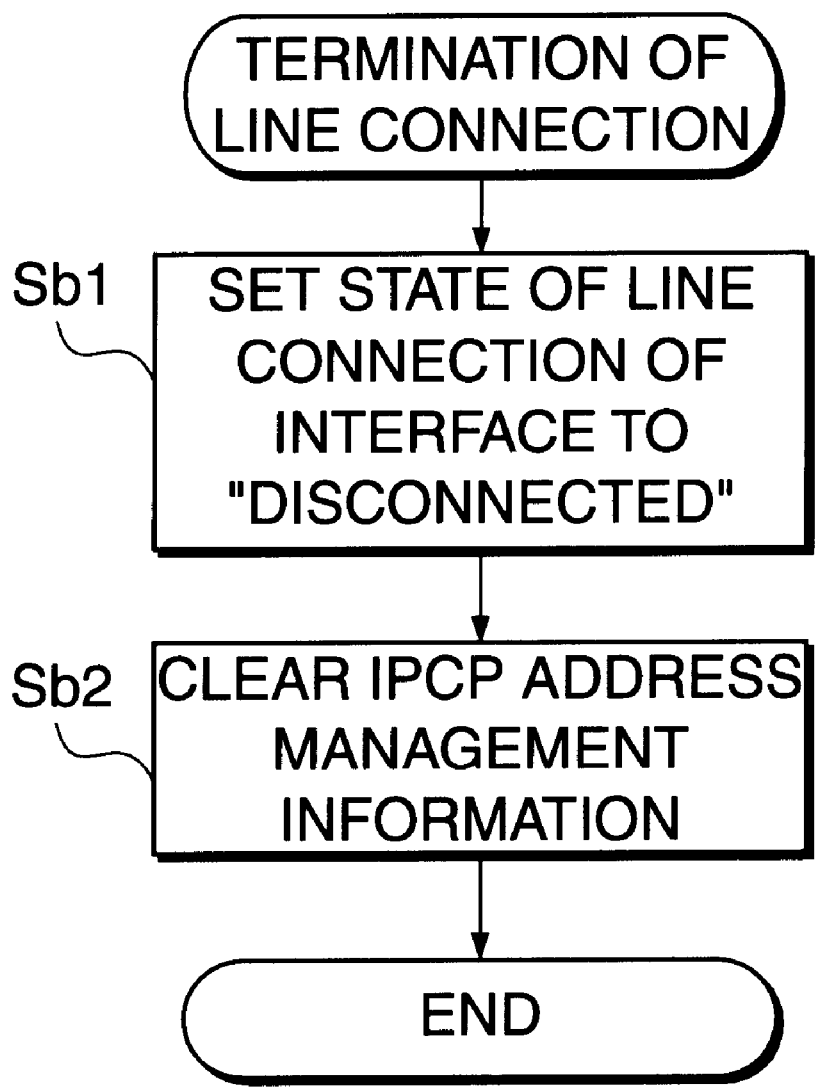
FIG. 19 is a flowchart showing a process routine carried out by the interface PP1 when line connection is terminated.

At this time, the block PP1*b* carries out the line connection processing. In this processing, the dialing is carried out, and then, a routine shown in FIG. 17 is executed. In this routine, first, at a step Sa1, a state of line connection of the interface PP1 is set to "connected". FIG. 18 shows a table for use in setting the state of line connection. At the following step Sa2, it is determined whether or not an ipcp address has been given to the router. The ipcp address is a global address transmitted from an internet access provider by IPCP (Internet Protocol Control Protocol). If the answer to the question is affirmative (Yes), the program proceeds to a step Sa3, wherein the address is written into the management information (see FIG. 18). On the other hand, if the answer to the question is negative (No), the routine is terminated without executing the step Sa3. After the line connection processing is completed, the packets are sent out onto the ISDN line. Further, when the line connection is terminated, a line connection terminating routine is carried out as shown in FIG. 19, wherein at a step Sb1, the state of line connection of the interface PP1 is set to "disconnected", and then at a step Sb2, the FIG. 18 table is reset, followed by terminating the routine.

Next, description will be made of a case in which a computer (hereinafter referred to as "the computer B") on a network 2 appearing in FIG. 5 sends data to the computer A on the network 1. In this case, each packet transmitted from the computer B carries a global address assigned to the network 1 and a private address assigned to the computer B as a destination address and a source address, respectively. The packet is sent to the block LAN2*a* of the interface LAN2 via the Ethernet controller 6 and the Ethernet driver 32. The block LAN2*a* translates the private address as the source address into a global address based on the NAT descriptor management information. Then, the packet is passed to the IP routing block 11, which carries out routing of the packet. When it is detected by the routing that the packet is directed to the network 1, the packet is passed to the block LAN1*a* of the interface LAN1, which carries out the address translation of the packet. More specifically, the block LAN1a translates the global address as the destination address into the private address of the computer A based on the NAT descriptor management information (FIG. 6), followed by the packet being sent to the computer A.

As described above, the router according to the present embodiment can perform the address translation and line connection processing as separate processes and at the same time makes the address translation adapted to more general uses by using the NAT descriptor. Further, the router allows a user to set the NAT descriptor freely.

It should be noted that although the above description of processing by the present embodiment is directed to examples of the network address translation (NAT) which carries out the address translation alone, when the IP masquerade is carried out, not only addresses but also port numbers are translated. More specifically, according to the embodiment, when a packet of data is sent out, a private address as a source IP address is translated into a global address, and at the same time a private port number as a source port number is translated into an available global port number, and the packet having the resulting source IP address and source port number is sent out. On the other hand, when a response packet is received, the global address added to the response packet as its destination address (identical to the source global address to which the private address is translated when the packet is sent out) and its port number (identical to the above destination port number) are translated into the correspondent private address and the private port number associated therewith. That is, the translation of port numbers in the IP masquerade is managed based on correspondence of private port numbers and destination port numbers written into the FIG. 9 masquerade management table.

What is claimed is:

1. A router for controlling transmission of packets over a plurality of networks, the router having a function of carrying out address translation of addresses added to said packets between private addresses and global addresses, the router comprising:

a plurality of interfaces each connected to a corresponding one of said plurality of networks;

a first storage device that stores data for said address translation, said data being set by a user;

a second storage device that stores information for applying said data stored in said first storage device to each of said plurality of interfaces, said information being set by said user;

a control device that prepares translation management information for each of said plurality of interfaces, based on said data stored in said first storage device and said information stored in said second storage device; and a translation device arranged in each of said plurality of interfaces, for carrying out said address translation of one of said addresses added to each packet of said packets, based on said translation management information.

2. A router according to claim 1, wherein said data stored in said first storage device comprises data of a first list that defines ranges of said global addresses, data of a second list that defines ranges of said private addresses, and data of a third list that defines correspondence between each of said global addresses and each of said private addresses.

3. A router according to claim 1, wherein said second storage device stores a plurality of sets of said information each in association with each of said plurality of interface.

4. A router according to claim 2, wherein said second storage device stores a plurality of sets of said information each in association with each of said plurality of interfaces.

5. A router according to claim 2, wherein said data stored in said first storage device further includes data of a fourth list defining correspondence between each of said private addresses and each of port numbers associated with each of said private addresses, and wherein said translation device carries out translation between a private address and one of said port numbers associated with said private address and a predetermined global address and a port number associated with said predetermined global address.

6. A router according to claim 1, wherein said translation management information prepared by said control device includes a network address translation management table in which a plurality of global addresses and a plurality of private addresses correlated to a part of said plurality of global addresses, respectively, are written in advance for use in static network address translation, a private address being written into said network address translation management table in a manner correlated to one of a remainder of said plurality of global addresses at start of communication via said router, for use in dynamic network address translation.

7. A router according to claim 1, wherein said translation management information prepared by said control device includes a masquerade management table in which a destination address, a destination port number, a global address, and a life are written in advance by a user in a manner correlated to one of fixed combinations of a protocol, a private address, and a port number associated with said private address, for use in static internet protocol masquerade.

8. A router according to claim 7, wherein a combination of a protocol, a private address, a port number associated with said private address, a destination address, a destination port number, a global address, and a life are written into said masquerade management table at start of communication via said router, for use in dynamic internet protocol masquerade.

9. A router according to claim 1, wherein said plurality of networks include the Internet, and a plurality of local area networks, and wherein said plurality of interfaces include at least one interface that carries out line connection processing for connection to a line connected to the Internet.

10. A router according to claim 1, wherein said plurality of networks include a plurality of local area networks, said plurality of interfaces including interfaces corresponding to said plurality of local area networks having respective global addresses assigned thereto, thereby permitting transmission of said packets between said plurality of local area networks.

* * * * *